United States Patent [19]

Uchida et al.

[11] 4,309,088
[45] Jan. 5, 1982

[54] FILM MAGAZINE HAVING AN IDENTITY MARK FOR IDENTIFYING SENSITIVITY OF THE FILM AND A CAMERA THEREFOR

[75] Inventors: Yasuo Uchida; Michio Yagi; Kazuo Shiozawa, all of Hachioji, Japan

[73] Assignee: Konishiroku Photo Industry Co., Ltd., Tokyo, Japan

[21] Appl. No.: 59,133

[22] Filed: Jul. 20, 1979

[30] Foreign Application Priority Data

Jul. 24, 1978 [JP] Japan ................................. 53/89386

[51] Int. Cl.³ ............................................. G03B 17/24
[52] U.S. Cl. ........................................ 354/21; 354/49; 354/51
[58] Field of Search .................... 354/21, 28, 31, 37, 354/41, 51, 58, 59, 275, 289, 42, 49; 352/78 C, 92; 242/71.1; 206/316, 389, 407

[56] References Cited

U.S. PATENT DOCUMENTS 3,492,927  2/1970  Thiele et al. .................... 352/78 C
3,602,117  8/1971  Eagle et al. ..................... 352/78 C
4,024,557  5/1977  Aoyama et al. .................... 354/275

FOREIGN PATENT DOCUMENTS 2048531  4/1972  Fed. Rep. of Germany ...... 354/275

Primary Examiner—L. T. Hix
Assistant Examiner—William B. Perkey
Attorney, Agent, or Firm—Bierman & Bierman

[57] ABSTRACT

A film magazine is provided with a peripheral surface carrying at least one photoelectrically discriminatable strip-like mark indicative of the sensitivity of film contained within the magazine, and a photographic camera having a shutter operating circuit automatically adjustable in accordance with the sensitivity of photographic film contained within such a film magazine inserted into the camera includes photoelectric discriminating means located in the camera for discriminatably reading the at least one strip-like mark on the film magazine when placed in the magazine chamber.

2 Claims, 3 Drawing Figures

A
FILM MAGAZINE HAVING AN IDENTITY MARK FOR IDENTIFYING SENSITIVITY OF THE FILM AND A CAMERA THEREFOR

BACKGROUND OF THE INVENTION

1. Field of the Invention

The present invention relates to a film magazine having an identity mark for identifying sensitivity of the film and a photographic camera which is capable of automatically setting its mechanisms in accordance with the sensitivity of the film.

2. Description of the Prior Art

With respect to approaches for automatically identifying and setting a camera in accordance with the sensitivity of photographic film to be used, there has been hitherto known an arrangement in which a convex-concave profile or notch formed in an external side wall of a film cartridge is sensed by a contacting piece provided in the photographic camera; the sensitivity of the film is thus determined in dependence on the displacement of the contacting piece and is correspondingly set in the camera. Another prior art arrangement resides in the provision of an alternating pattern of electrically conductive zones and insulating zones at an outer peripheral portion of a film magazine, whereby the pattern is sensed by a physically contacting piece to correspondingly set the detected film sensitivity. These hitherto known film sensitivity detecting systems are common in being of the physical contact type. Accordingly, they suffer from drawbacks in that the sensor element is poor in durability as well as in operational reliability. Furthermore, limitations are encountered with respect to the position and space for installing the sensitivity detecting mechanism, presenting additional requirements for accuracy in the assembly.

SUMMARY OF THE INVENTION

With the present invention, it is contemplated to provide a film magazine having an identity mark for identifying sensitivity of the film contained therein and a photographic camera which is capable of automatically setting its mechanisms in accordance with the sensitivity of the film from the identity mark and which is immune to the drawbacks of hitherto known arrangements such as those described above.

In view of the above object, there is proposed according to an aspect of the invention a film magazine which is provided at an outer peripheral portion thereof with at least one strip-like mark for identifying the sensitivity of photographic film contained in the magazine. According to another feature of the invention, a photographic camera is provided with a magazine chamber for containing the film magazine described above in combination with photoelectric means for reading the mark, thereby to automatically set the detected sensitivity in the camera mechanism.

Thus, according to the teaching of the invention, the photoelectric sensor means is capable of detecting information about the film sensitivity from the strip-like film sensitivity identifying mark in a contactless manner. As a result, there will be involved no erroneous information due to failure in contact or non-smooth movement of the contacting piece as in prior art film sensitivity detecting and setting systems. Furthermore, the arrangement according to the invention is utterly immune to the problem of wearing. Although accuracy to some degree is required for mounting the photoelectric sensing and discriminating means with respect to its position in the axial direction of the magazine, there is a relatively high degree of freedom in the positioning of the photoelectric means in the circumferential direction of the magazine where the sensitivity identifying mark extends in the circumferential direction. Thus, the provision of the photoelectric film sensitivity discriminating means will not give rise to an increase in the overall size of the camera or difficulty in design.

In the following, the invention will be described in detail with respect to a preferred exemplary embodiment thereof by referring to the accompanying drawings.

DETAILED DESCRIPTION OF THE PREFERRED EMBODIMENTS

Figure 1:
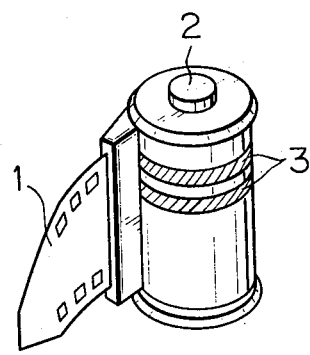
FIG. 1 is a perspective view showing a photographic film magazine according to an embodiment of the invention.
Figure 2:
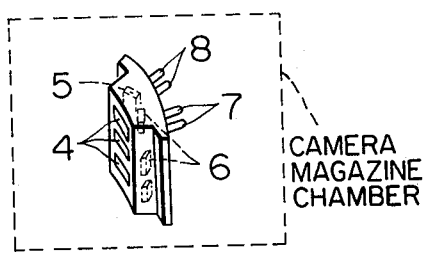
FIG. 2 is a perspective view showing an exemplary embodiment of a photo-sensor such as a photo-coupler used according to the invention.

Referring to FIG. 1, numeral 1 denotes a film, 2 denotes a film magazine and 3 designates a code or identity mark for identifying or representing the sensitivity of the film 1. In the case of the illustrated example, the code mark is constituted by a pair of colored bands. Because the code mark is implemented in the form of colored bands extending circumferentially around the peripheral surface of the magazine, a relatively high degree of freedom is available in determining the position of a photoelectric sensor installed in a given photographic camera, as will be described hereinafter. In addition, there is no possibility of erroneous information being provided due to small rotation of the film magazine. Referring to FIG. 2, the photoelectric sensor has windows 4 formed at positions corresponding to those of the colored bands 3 formed in the film magazine 2 and adapted to project light rays and receive the reflected rays from the colored code bands 3. Light emission or emitting elements 5 which are provided in one-to-one correspondence to the windows 4 produce radiations projected onto the associated colored code bands 3. The light radiations reflected and modulated by the colored code bands impinge onto light receiving elements 6 through the windows 4 in a manner similar to the light emission elements 5, resulting in the appearance of an output signal at output terminals 7. This output signal represents the sensitivity of the film 1 contained in the film magazine 2 and is utilized for setting the film sensitivity factor in the associated photographic camera with the aid of an automatic sensitivity setting device known per se in the art. Numeral 8 denotes input terminals across which a voltage signal for activating the light emission elements 5 is applied.

Figure 3:
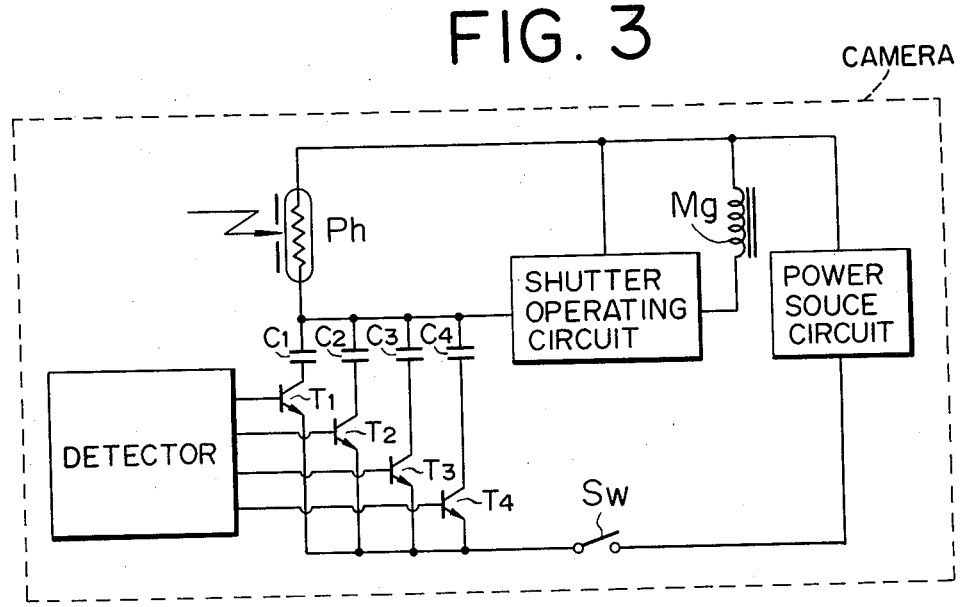
FIG. 3 is a schematic diagram showing a circuit arrangement for introducing the film sensitivity information into an electric shutter circuit of an automatic exposure control system for a photographic camera.

Referring to FIG. 3 which shows an exemplary circuit configuration for introducing the film sensitivity information obtained in the manner described above into an electric shutter circuit of an automatic exposure control system, reference symbol Ph represents a light sensor element of the automatic exposure control system, Mg represents an electromagnet for controlling a rear curtain, Sw denotes a switch which is turned on in response to the closing of a rear cover plate of a camera, $C_1$ to $C_4$ designate capacitors, and $T_1$ and $T_4$ denote transistors. In operation, when a film magazine provided with the sensitivity identifying code mark 3 is inserted in a magazine chamber of a camera and the rear cover plate is closed, the switch Sw is correspondingly closed, whereby the electric shutter circuit is placed in a state ready to be operated. The sensitivity code mark 3 is detected by the sensor or detector unit of the structure described above in conjunction with FIG. 2 and the output signal therefrom representing the code mark is supplied to the transistors $T_1$ to $T_4$ which then become appropriately conductive.

Assuming now that the circuit shown in FIG. 3 is capable of automatically discriminating the film sensitivities of four grades, e.g. ASA 50, ASA 100, ASA 200 and ASA 400, from one another and that a photographic film roll of ASA 100 is inserted in the camera, the detector or sensor unit which has discriminated the film sensitivity of ASA 100 will produce an output voltage signal which turns on the transistors $T_1$, $T_2$ and $T_3$, for example. When the shutter is released in this condition, the signal information of the shutter operating time to be utilized in the automatic exposure control is supplied from the ambient illumination sensor Ph to a shutter actuator circuit together with the film sensitivity signal with delays corresponding to the charging time constants of the capacitors $C_1$, $C_2$ and $C_3$, whereby the time point for initiating the running operation of the shutter rear curtain is determined and a signal is produced at the determined time point from the shutter actuator circuit thereby to deenergize the electromagnet Mg which has retained the rear curtain up to that time point. In this manner, the exposure process is executed. Similar operations will take place for films having other film sensitivities. For example, in the case of film of ASA 50, all of the transistors $T_1$ to $T_4$ are turned on. For film of ASA 200, the transistors $T_1$ and $T_2$ are turned on, while for film of ASA 400, only the transistor $T_1$ is turned on. Depending upon which of the transistors T are turned on in the manner described above, the associated capacitor or capacitors C is or are set in a state ready for charging with electric energy.

It goes without saying that when a mechanism for manually setting the film sensitivity is provided in addition to the automatic film sensitivity detecting and setting system according to the invention in a photographic camera, the film contained in a film magazine having no sensitivity identifying code such as the one shown in FIG. 1 can be equally used. In this case, it is preferred that a predetermined signal be produced by the photoelectric discriminating circuit or apparatus and utilized to render the film sensitivity automatic setting circuit or apparatus inoperative while allowing the manual setting means to be converted to an operative state. In this manner, a photographic camera having an enhanced flexibility can be attained. Further, with respect to manual sensitivity setting, an alarm signal for informing the user of the need for manual setting of the film sensitivity in the camera may be produced through suitable means known in the art.

It should be mentioned here that the band-like code mark for identifying the film sensitivity need not necessarily be extended in the circumferential direction of the film magazine, but may instead be provided in the axial direction of the film magazine, although the disposition of the photoelectric discriminating device is then restricted to some degree. Furthermore, it goes without saying that the length of the code mark may be shortened along the circumferential direction of the magazine. Still further, the code mark may be implemented in configurations other than the illustrated band-like form. In these cases, if the sensitivity identifying code provided on the film magazine is carried through an optical fiber means coupled to the photoelectric discriminating device and provided in the magazine chamber of the camera, restriction in the disposition of the photoelectric discriminating device can be obviated.

It will be self-explanatory that the film sensitivity information can be also supplied to a system for printing the photographing date by means of a light emitting diode array thereby to attain the optimum exposure.

What we claim is:

1. In a photographic camera having a shutter operating circuit automatically adjustable in accordance with the sensitivity of photographic film contained within a film magazine inserted into the camera, a magazine chamber for accommodating a film magazine having a peripheral surface on which is provided at least one photoelectrically discriminatable strip-like mark indicative of the sensitivity of film contained within the magazine, and photoelectric discriminating means located in the camera for discriminatably reading said at least one strip-like mark on a film magazine placed in said magazine chamber.

2. In a photographic camera according to claim 1, said photoelectric discriminating means comprising a sensor adapted to photoelectrically detect the film sensitivity indicating mark and to provide an output corresponding to said detection, a plurality of transistors each having a base to which the output signal of the sensor is applied and a collector, and a plurality of capacitors each connected in series with the collector of a corresponding one of the plural transistors and in parallel with each other.

* * * * *